(12) United States Patent
Priel et al.

(10) Patent No.: US 7,855,581 B2
(45) Date of Patent: Dec. 21, 2010

(54) REAL TIME CLOCK MONITORING METHOD AND SYSTEM

(75) Inventors: Michael Priel, Hertzelia (IL); Asaf Ashkenazi, Austin, TX (US); Dan Kuzmin, Givat Shmuel (IL)

(73) Assignee: Freescale Semiconductor, Inc., Austin, TX (US)

( * ) Notice: Subject to any disclaimer, the term of this patent is extended or adjusted under 35 U.S.C. 154(b) by 134 days.

(21) Appl. No.: 12/376,557

(22) PCT Filed: Aug. 8, 2006

(86) PCT No.: PCT/IB2006/052733

§ 371 (c)(1),
(2), (4) Date: Feb. 5, 2009

(87) PCT Pub. No.: WO2008/017904

PCT Pub. Date: Feb. 14, 2008

(65) Prior Publication Data

US 2010/0225357 A1    Sep. 9, 2010

(51) Int. Cl.
*H03K 5/19* (2006.01)

(52) U.S. Cl. .......................... 327/20; 327/47; 713/500; 713/501; 713/503

(58) Field of Classification Search .................. 327/18, 327/20, 21, 44, 45, 47–49; 713/500, 501, 713/503
See application file for complete search history.

(56) References Cited

U.S. PATENT DOCUMENTS

| 5,523,708 | A  | * | 6/1996  | Yamasaki ..................... 327/20 |
| 5,920,727 | A  | * | 7/1999  | Kikinis et al. ................ 713/323 |
| 6,985,811 | B2 | * | 1/2006  | Gronemeyer ............... 701/213 |
| 7,504,865 | B2 | * | 3/2009  | Itoh et al. ...................... 327/47 |
| 7,733,117 | B1 | * | 6/2010  | Priel et al. ...................... 326/8 |
| 2002/0017925 | A1 | * | 2/2002  | Teraishi ........................ 327/20 |
| 2002/0083284 | A1 | * | 6/2002  | Matsubara et al. .......... 711/163 |
| 2003/0212531 | A1 | * | 11/2003 | Kerr et al. .................... 702/188 |
| 2004/0128528 | A1 | * | 7/2004  | Poisner ........................ 713/200 |
| 2004/0158761 | A1 | * | 8/2004  | Matsuoka et al. ........... 713/600 |
| 2010/0070791 | A1 | * | 3/2010  | Priel et al. ................... 713/340 |

* cited by examiner

*Primary Examiner*—Lincoln Donovan
*Assistant Examiner*—Patrick O'Neill

(57) ABSTRACT

Method for monitoring a real time clock and a device having real time clock monitoring capabilities, the device includes: (i) a real time clock tree, (ii) a clock frequency monitor that is adapted to determine a frequency of a real time clock signal, during a short monitoring period; (iii) a monitoring enable module, adapted to activate the clock frequency monitor during short motoring periods and to deactivate the clock frequency monitor during other periods, wherein the monitoring enable module is adapted to determine a timing of the short monitoring periods in a non-deterministic manner; and (iv) a real time clock violation indication generator adapted to indicate that a real time clock violation occurred, in response to an error signal provided from the clock frequency monitor.

20 Claims, 5 Drawing Sheets

REAL TIME CLOCK MONITORING METHOD AND SYSTEM

FIELD OF THE INVENTION

The present invention relates to methods for real time clock monitoring and for devices having real time clock monitoring capabilities.

BACKGROUND OF THE INVENTION

Real time clock generators have various applications. They can be used for providing timing information for operating systems, for enforcing policies for time-sensitive data, for assisting in positioning calculations and the like. U.S patent application serial number 2002/0083284 of Matsubara et al., titled "Data reproduction system, data recorder and data reader preventing fraudulent usage by monitoring reproducible time limit", U.S. Pat. No. 5,920,727 of Kikinis et al., titled "Timer-controlled computer system shutdown and startup", U.S patent application serial number 2004/0128528 of Poisner titled "Trusted real time clock" and U.S patent application serial number 2004/0225439 of Gronemeyer, titled "Method and apparatus for real time clock (RTC) brownout detection, all being incorporated herein by reference, illustrate some usages of real time clocks.

Real time clock signals can be tampered for various reasons including copyrighting piracy, concealing hacking or tampering attempts, reducing the functionality of a device and the like.

Modern integrated circuit providers are required to monitor the real time clocks signal and especially to detect if the frequency of the clock signal is outside a predefined frequency window. Real time clock monitoring circuits, such as sampling circuits or oscillating circuits operate at a higher monitoring frequency than the real time clock frequency. Typically the monitoring frequency is at least twice of the real time clock frequency, such as to comply with the Nyquist sampling rule.

The power consumption of a real time clock monitoring circuit is responsive to the monitoring frequency thus these real time clock monitoring circuits are power consuming. U.S. patent application serial number 2004/0225439 of Gronemeyer describes a constantly operating real time clock signal monitor.

Various apparatuses such as mobile phones, personal data appliances, media players and the like are required to operate for long time periods while using relatively small batteries. Using high power consuming real time clock signal monitoring circuits can reduce the operating period of such apparatuses.

There is a need to provide efficient methods and devices for performing real time clock monitoring.

SUMMARY OF THE PRESENT INVENTION

A device and a method for monitoring a real time clock and devices having real time clock monitoring capabilities, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Embodiments of the present invention illustrated in the accompanying drawings provide an information processing apparatus such as a mobile phone, a personal data accessory or a media player that includes a device that is capable of monitoring a real time clock.

Real time clock signal monitoring that is characterized by low power consumption involves activating a clock frequency monitor during short monitoring periods. The clock frequency monitor is deactivated between these short monitoring periods. The timing (start time and/or end time) of the short monitoring periods is determined in a non-deterministic manner such as in a random manner or in a pseudo-random manner. The non-deterministic timings prevents or complicates a provision of a proper real time clock signal during the monitoring periods while providing a jammed real time clock signal during other periods.

According to an embodiment of the invention the monitoring also includes tracking after the provision of the real time clock signal and generating a real time clock stop indication if the real time clock signal was disabled for a long period. The clock signal monitoring is conveniently done by using a low power consuming clock stop monitor. This monitoring can prevent a real time clock jamming entity from stopping the provision of the real time clock signal to the clock frequency monitor thus preventing the clock frequency monitor from generating a real time clock violation indication.

A jammed real time clock signal includes any real time clock signal that differs from the original real time clock signal and that has characteristics that differ from the required characteristics of the original real time clock signal.

Conveniently, a non-deterministic number source can constantly generate new non-deterministic numbers. According to an embodiment of the invention at least a portion of the non-deterministic number source can be deactivated during certain periods in order to reduce the power consumption.

New non-deterministic numbers can be generated during device power on period, during various predefined periods and the like.

Conveniently, the non-deterministic number source includes a non-deterministic number generator and a temporal storage unit that stores the non-deterministic numbers generated by the generator. The storage unit can be powered even when the non-deterministic number generator is idle.

Figure 1:
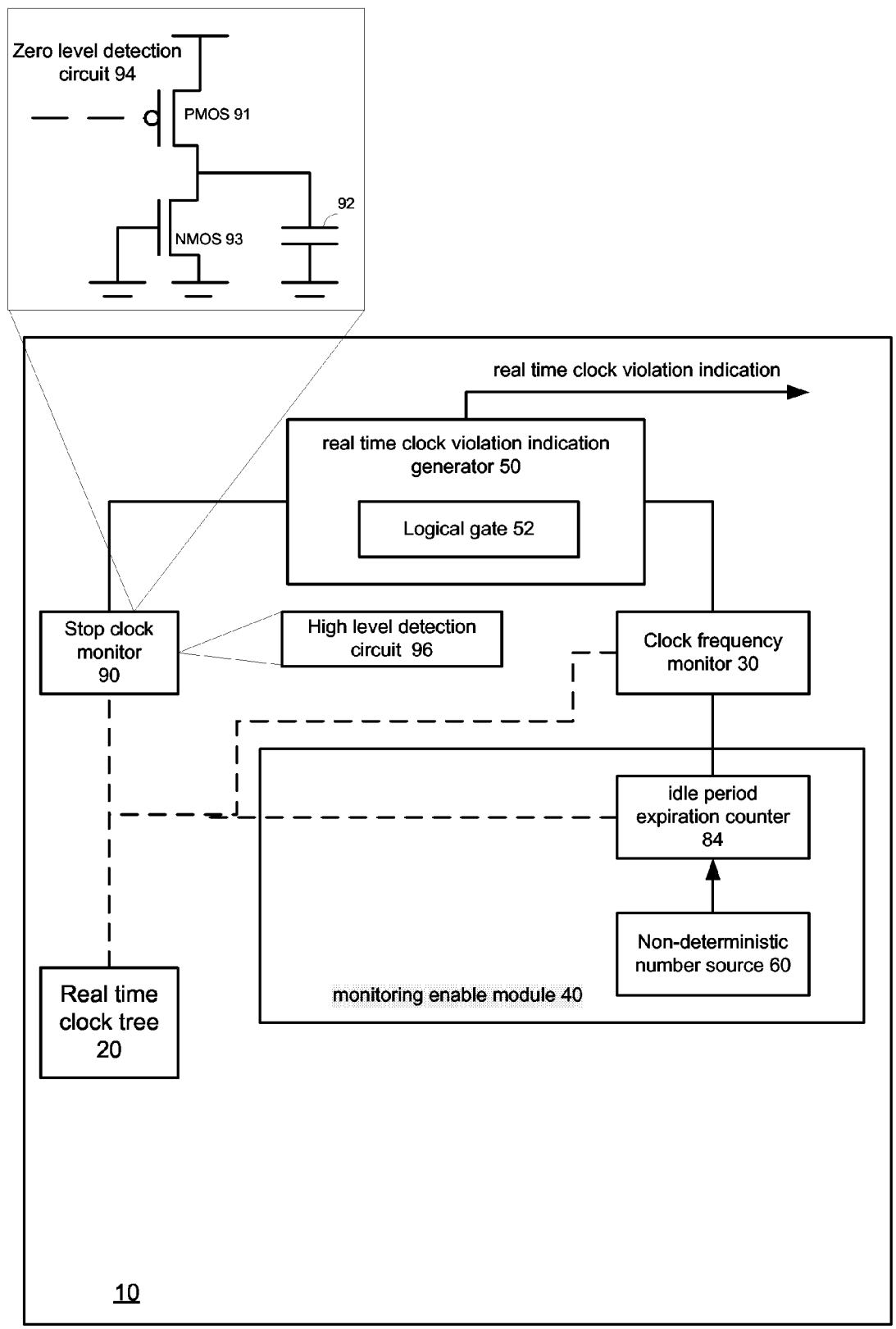
FIG. 1 illustrates an apparatus according to an embodiment of the invention.

FIG. 1 illustrates apparatus 9 according to an embodiment of the invention. Apparatus 9 is an information (data and/or media) processing apparatus and can include device 10. Apparatus 9 can be a mobile device such as but not limited to laptop computer, a mobile phone, a media player, a mobile game console and the like. Apparatus 9 can also be a stationary apparatus such as a desktop computer, a plasma screen, a television, a media entertainment system, a security/monitoring system, a stationary game console and the like. Apparatus 9 as well as device 20 can include one or more displays, processors, memory units, loudspeakers, microphones, DMA controllers, and the like.

Device 10 can include one or more integrated circuits. It can generate a real time clock signal or receive a real time clock signal. Typically, device 10 generates the real time clock signal but this is not necessarily so. According to an embodiment of the invention device 10 can reconstruct a real time clock signal from information signals.

The real time clock signal is distributed between various components of device 10 by a real time clock distribution network or grid such as real time clock tree 20. At least one of these components can be involved in the monitoring of the real time clock signal while other components are not related to the monitoring.

Real time clock tree 20 provides the real time clock signal to monitoring enable module 40, to clock frequency monitor 30 and to stop clock monitor 90.

Clock frequency monitor 30 is adapted to determine the frequency of a real time clock signal, during a short monitoring period and conveniently during a single real time clock cycle. It can include a sampling circuit that samples the real time clock signal during multiple points in time during one (or few) real time clock cycles. It can include a high frequency oscillator that is connected to a counter whereas the number of oscillations during one or few real time clock cycles indicates the frequency of the real time clock signal.

Clock frequency monitor 30 is connected to monitoring enable module 40 and is activated (as well as deactivated) by the monitoring enable module 40. Clock frequency monitor 30 can be activated by a provision of an enable signals, although other prior art activation methods can also be applied. For example, the monitoring enable module can stop the provision of one or more clock signals that are provided to the clock frequency monitor 30 and additionally or alternatively can reduce (even to zero) the power supply provided to the clock frequency monitor 30.

Monitoring enable module 40 is adapted to determine the timing (start time and/or end time) of the short monitoring periods in a random or in a pseudo-random manner. The length of idle periods between the short monitoring periods can be non-deterministically determined (for example—determined in a random or pseudo-random manner) after each short monitoring period.

According to one embodiment of the invention monitoring enable module 40 can apply various prior art techniques for determining in a random or in a pseudo random manner the timing of the short monitoring periods.

According to another embodiment of the invention the monitoring enable module 40 determines the timing (start time and/or end time) of the short monitoring periods in response to a first non-deterministic number and in response to a dynamically changing number. The first non-deterministic number can be fixed during very long periods and even during the lifespan of monitoring enable module 40. The dynamically changing number can change in response to the real time clock signal but this is not necessarily so.

Idle period expiration counter 84 is loaded with a multi-bit random or pseudo random number provided from non-deterministic number source 60 and counts down until the idle period expires and a new short monitoring period starts. During that short monitoring period the clock frequency monitor 30 is enabled.

It is noted that non-deterministic number source 60 can include a random number generator, a pseudo-random number generator or a combination thereof.

Clock frequency monitor 30 is adapted to generate a real time clock frequency error signal if the frequency of the monitored real time clock signal is outside a predefined frequency window. The width of the frequency window is responsive to the allowed accuracy of the real time clock signal.

Real time clock violation indication generator 50 is connected to clock frequency monitor 30 and if it receives a real time clock frequency error signal from clock frequency monitor 30 it generates a real time clock violation indication. This indication can trigger a re-starting device 10, can trigger the generation of an audio and/or visual alert to a user of device 10, to a remote user and the like.

According to an embodiment of the invention device 10 also includes stop clock monitor 90 that is adapted to determine that a real time clock signal was not supplied during a long period. A clock signals is deemed not to be supplied if it does not alternate. For example, supplying, over a long period, only a high level signal or only a low level signal, is defined as the lack of clock signal. Stop clock signal can include a high-level detection circuit 94 and a low-level detection circuit 96. High-level detection circuits are known in the art and do not require additional information. The high-level detection circuit (as well as the low-level detection circuit) circuit can include one or more components that are characterized by a long charge time constant and a long discharge time constant. The circuit is charged by the real time clock signal can be discharged by leakage currents. If a constant high signal is provided the circuit will not be discharged (or only slightly discharged) and this state can indicate a provision of a constant high clock signal during a long period.

Stop clock monitor 90 is characterized by low power consumption.

The stop clock monitor 90 is not necessarily accurate. It can consume low power by measuring the long time periods based upon leakage currents. The amplitude of leakage currents is hard to predict and the stop clock monitor 50 can measure the long period with a low accuracy.

Conveniently, the stop clock monitor 90 includes a capacitor 92 adapted to be charged by the real time clock signal and to be discharged by a leakage current. A capacitor can be included within a transistor, be a parasitic capacitor and the like. The inventors used a pair of MOS transistors 91 and 93 and capacitor 92. NMOS transistor 93 is connected in parallel to capacitor 92. NMOS transistor 93 and capacitor 92 are connected between the ground and between PMOS transistor 91. PMOS transistor 91 is further connected to a power supply and also receives (via its gate) the real time clock signal. PMOS transistor 91 provides a charge path to capacitor 92 and NMOS 93 provides a discharge path to capacitor 92. If the real time clock signal is not provided to stop clock monitor 90 the capacitor discharges until the voltage of capacitor 92 reaches a predefined level that indicate that a failure occurred.

If stop clock monitor 90 finds that a real time clock signal was not provided during a long period then it generates a real time clock stop indication.

The real time clock stop indication is sent to real time clock violation indication generator 50 that in turn can generate a real time clock violation indication. Conveniently, real time clock violation indication generator 50 includes logical gate 52 that is adapted to generate a real time clock violation indication if it receives a real time clock frequency error signal from clock frequency monitor 30 and/or a real time clock stop indication from stop clock monitor 90.

Figure 2:
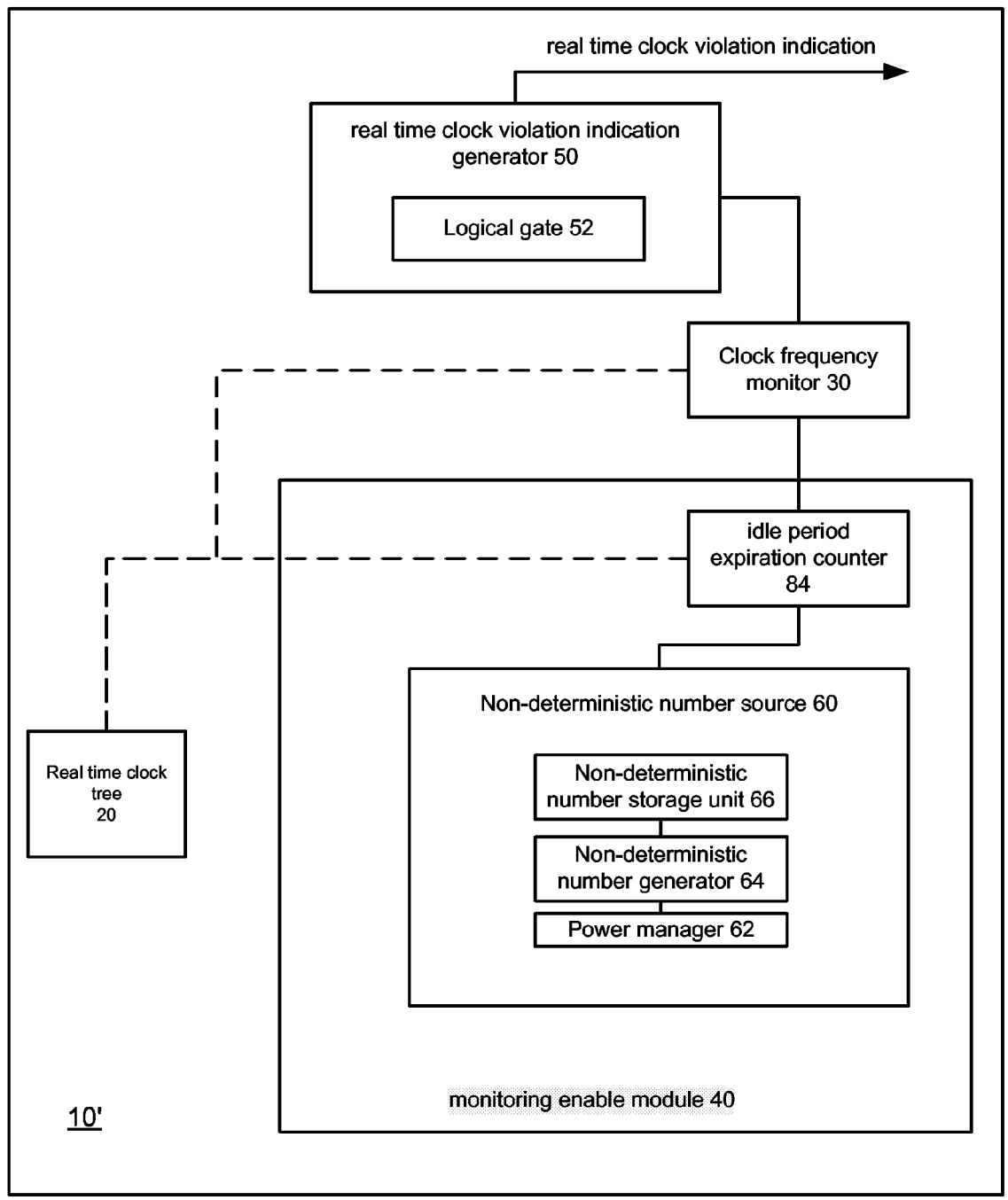
FIG. 2 illustrates an apparatus according to another embodiment of the invention.

FIG. 2 illustrates apparatus 9' according to an embodiment of the invention. Apparatus 9' includes device 10' that differs from device 10 of FIG. 1 by not having clock stop monitor 90.

In addition, its real time clock violation indication generator 50 is only responsive to error signals provided by clock frequency monitor 30.

In addition FIG. 2 illustrates various components of device 10' such as: (i) non-deterministic number storage unit 62 that is adapted to store a non-deterministic (random or pseudo random) number, (ii) non-deterministic number generator 64, and (iii) power manager 66 that is adapted to selectively provide power to the non-deterministic number generator 64.

Power manager 66 can activate the non-deterministic number generator 64 during powering up sequences of device 10' or during selected periods.

It is further notes that power manager 66 can also control a frequency of a clock signal provided to non-deterministic number generator 64.

Figure 3:
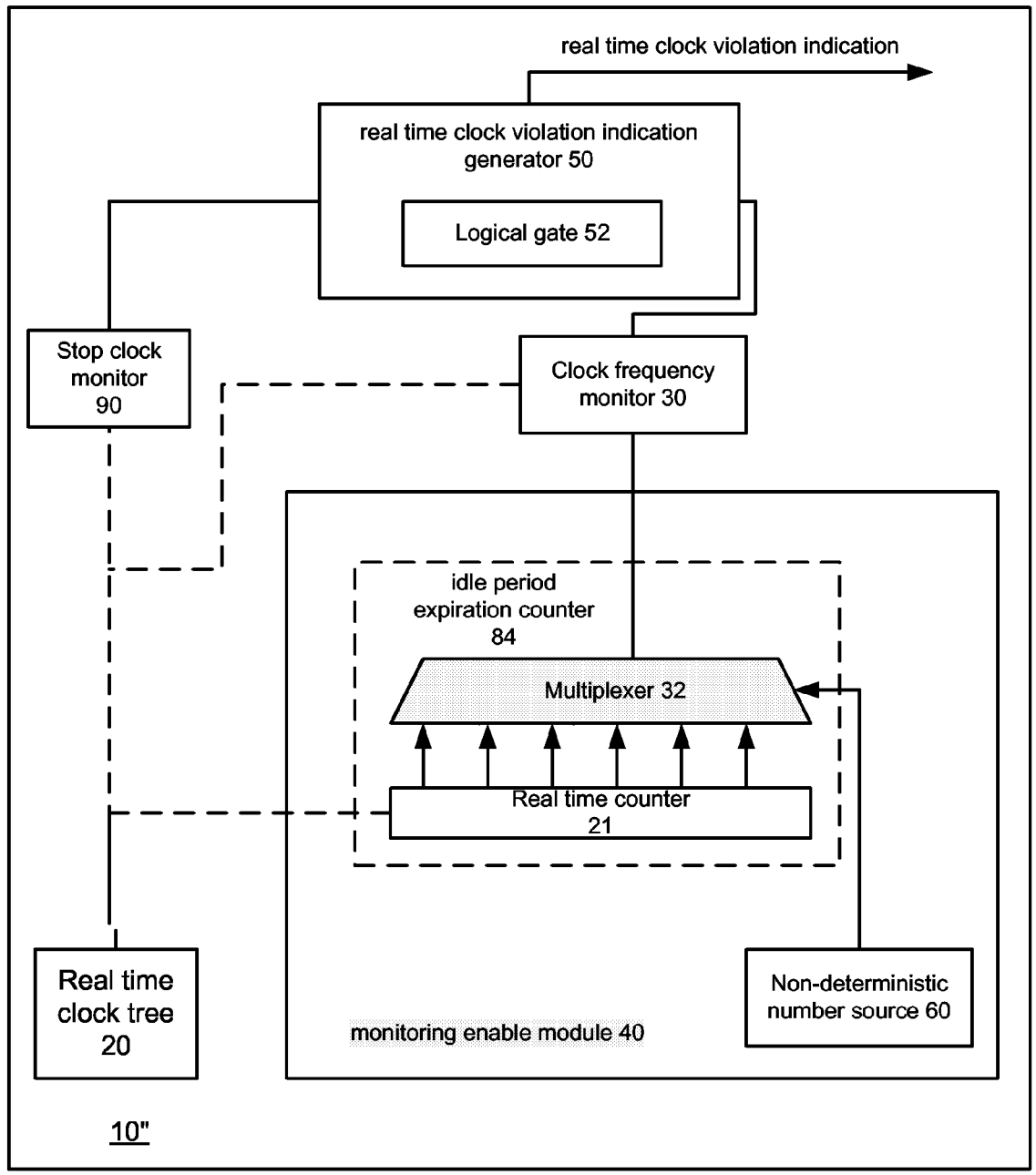
FIG. 3 illustrates an apparatus according to another embodiment of the invention.

FIG. 3 illustrates apparatus 9" according to an embodiment of the invention. Apparatus 9" is an information (data and/or media) processing apparatus and can include device 10".

Device 10" provides a more detailed example of idle period expiration counter 84. Idle expiration counter 84 includes a real time counter 21 that is fed by the real time clock signal provided by real time clock tree 20. This real time counter 21 includes multiple outputs that are connected to multiple parallel inputs of multiplexer 32. Non-deterministic number source 60 provides a control signal that determines which input of multiplexer 32 will be selected. The output of multiplexer 32 is connected to an input of clock frequency monitor 30.

Figure 4:
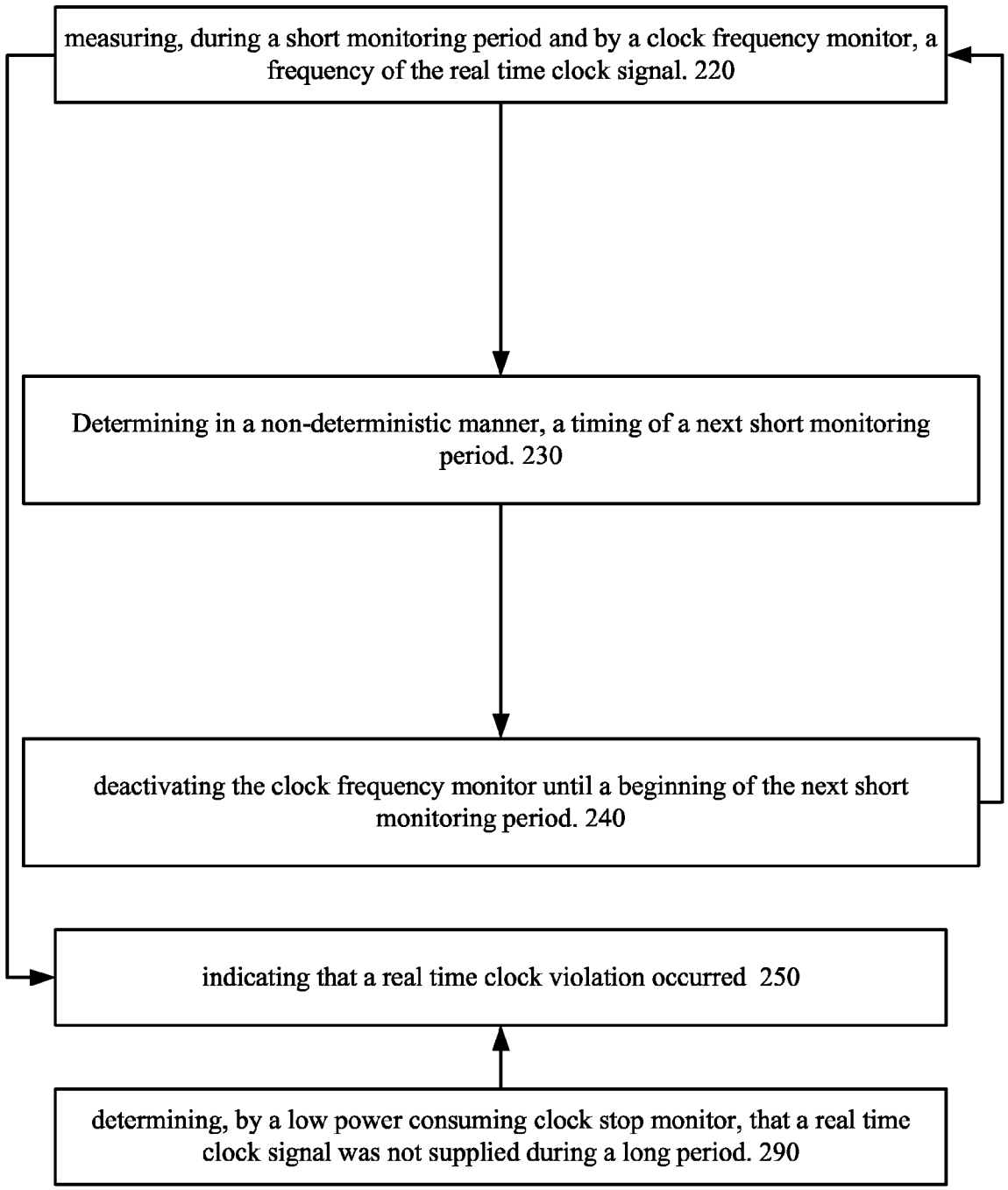
FIG. 4 illustrates a method for monitoring a real time clock signal according to an embodiment of the invention.

FIG. 4 illustrates method 200 for monitoring a real time clock signal according to an embodiment of the invention.

Method 200 starts by stages 220 and 290.

Stage 220 includes measuring, during a short monitoring period and by a clock frequency monitor, a frequency of the real time clock signal. Referring to FIGS. 1 and 2 this stage can be implemented by clock frequency monitor 30.

Conveniently, stage 220 includes accurately measuring the frequency of the real time clock signal in a single real time clock cycle.

Stage 220 is followed by stages 230 and 250.

Stage 250 includes indicating that a real time clock violation occurred if the frequency of the real time clock signal is outside a predefined frequency window. It is noted that if a real time clock violation occurred method 200 can stop but this is not necessarily so. For example a response to a real time clock violation can be responsive to one or multiple real time clock violations. The response can include resetting a device, powering down a device and the like.

Stage 230 includes determining in a non-deterministic manner (random or in a pseudo-random manner), a timing of a next short monitoring period.

Conveniently, the determining is responsive to a first random number stored within a one-time programmable random number storage unit.

Conveniently, stage 230 of determining comprises determining a timing of a next short monitoring period during at least a first period and disabling at least one non-deterministic number generator involved in the determining during at least a second period. Conveniently, the first period is a powering up period.

Stage 230 is followed by stage 240 of deactivating the clock frequency monitor until a beginning of the next short monitoring period.

Stages 230 and 240 can be implemented by monitoring enable module 40 of FIG. 1 and FIG. 2.

Stage 240 is followed by stage 220 measuring the frequency of the real time clock signal.

Stage 290 includes determining, by a low power consuming clock stop monitor, that a real time clock signal was not supplied during a long period.

Stage 290 is followed by stage 250 such that the indicating that a real time clock violation occurred comprises indicating that a real time clock error occurred if the real time clock signal was not supplied during the long period.

Conveniently, stage 290 includes monitoring a status of a capacitor within the clock stop monitor; wherein the capacitor is being charged by the real time clock and is being discharged by a leakage current.

Figure 5:
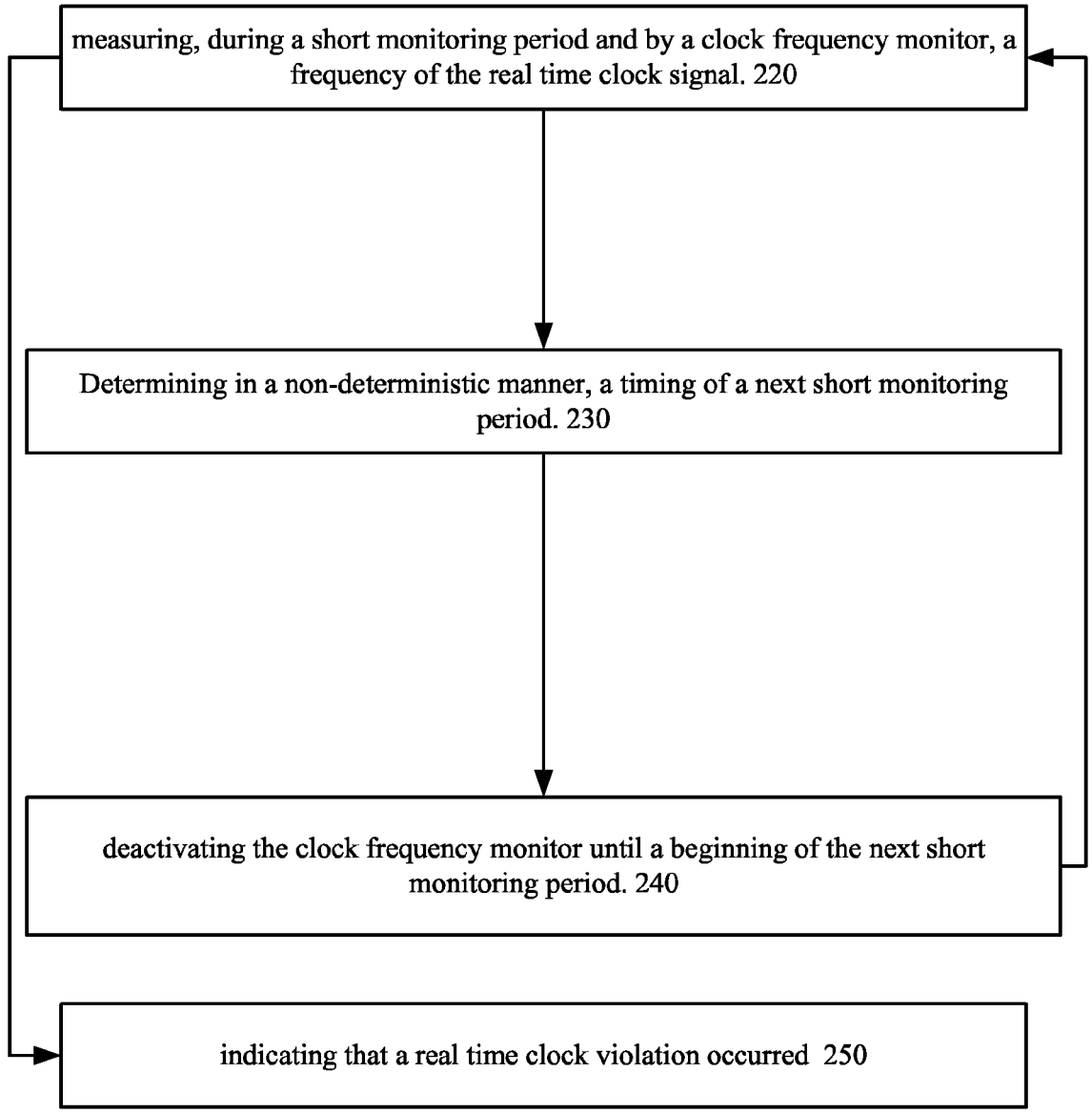
FIG. 5 illustrates a method for monitoring a real time clock signal according to another embodiment of the invention.

FIG. 5 illustrates method 200' for monitoring a real time clock signal according to an embodiment of the invention. Method 200' differs from method 200 of FIG. 3 by not including stage 290. Stage 250 is changed accordingly.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device having real time clock monitoring capabilities, the device comprises:
    a real time clock tree that is coupled to a clock frequency monitor that is adapted to determine a frequency of a real time clock signal, during a short monitoring period;
    a monitoring enable module, coupled to the real time clock tree and to the clock frequency monitor, adapted to activate the clock frequency monitor during short monitoring periods and to deactivate the clock frequency monitor during other periods, wherein the monitoring enable module is adapted to determine a timing of the short monitoring periods in a non-deterministic manner; and
    a real time clock violation indication generator, coupled to the clock frequency monitor, adapted to indicate that a real time clock violation occurred, in response to an error signal provided from the clock frequency monitor.

2. The device according to claim 1 wherein the monitoring enable module comprises a non-deterministic number storage unit adapted to store a non-deterministic number.

3. The device according to claim 2 wherein the monitoring enable module comprises a non-deterministic number generator and wherein the device comprises a power manager adapted to selectively provide power to the non-deterministic number generator.

4. The device according to claim 2 wherein the monitoring enable module is adapted to determine an idle period between two consecutive monitoring periods in response to a first random number and in response to a dynamically changing number.

5. The device according to claim 2 wherein the clock frequency monitor is adapted to accurately determine the frequency of the real time clock signal in a single real time clock cycle.

6. The device according to claim 1 wherein the monitoring enable module comprises a non-deterministic number generator and wherein the device comprises a power manager adapted to selectively provide power to the non-deterministic random generator.

7. The device according to claim 6 wherein the power manager is adapted to disable the non-deterministic random generator during periods other than a powering on period of the device.

8. The device according to claim 1 wherein the monitoring enable module is adapted to determine an idle period between two consecutive monitoring periods in response to a first random number and in response to a dynamically changing number.

9. The device according to claim 1 wherein the clock frequency monitor is adapted to accurately determine the frequency of the real time clock signal in a single real time clock cycle.

10. The device according to claim 1 further comprising a stop clock monitor adapted to determine that a real time clock signal was not supplied during a long period; wherein the stop clock monitor is characterized by low power consumption; and wherein the real time clock violation indication generator is further adapted to indicate that a real time clock violation occurred in response to a stop clock indicator provided from the stop clock monitor.

11. The device according to claim 10 wherein the stop clock monitor comprises a capacitor adapted to be charged by the real time clock signal and to be discharged by a leakage current.

12. The device according to claim 10 wherein the real time clock violation indication generator comprises a logical gate adapted to generate a real time clock violation indication if either the real time clock violation indication generator received an error signal from the clock frequency monitor or a real time clock stop indication from the stop clock monitor.

13. A method for monitoring a real time clock signal, the method comprises:
    measuring, during a short monitoring period and by a clock frequency monitor, a frequency of the real time clock signal;
    determining in a non-deterministic manner, a timing of a next short monitoring period;
    indicating that a real time clock violation occurred if the frequency of the real time clock signal is outside a predefined frequency window;
    deactivating the clock frequency monitor until a beginning of the next short monitoring period and jumping to the stage of measuring the frequency of the real time clock signal.

14. The method according to claim 13 wherein the measuring comprises accurately measuring the frequency of the real time clock signal in a single real time clock cycle.

15. The method according to claim 14 further comprising determining, by a low power consuming clock stop monitor, that a real time clock signal was not supplied during a long period; and wherein the indicating that a real time clock violation occurred comprises indicating that a real time clock error occurred if the real time clock signal was not supplied during the long period.

16. The method according to claim 13 further comprising determining, by a low power consuming clock stop monitor, that a real time clock signal was not supplied during a long period; and wherein the indicating that a real time clock violation occurred comprises indicating that a real time clock error occurred if the real time clock signal was not supplied during the long period.

17. The method according to claim 16 wherein determining that the real time clock signal was provided during the long period comprises monitoring a status of a capacitor within the clock stop monitor; wherein the capacitor is being charged by the real time clock and is being discharged by a leakage current.

18. The method according to claim 16 wherein the determining in a non-deterministic manner, a timing of a next short monitoring period comprises determining a timing of a next short monitoring period during at least a first period and disabling at least one non-deterministic number generator involved in the determining during at least a second period.

19. The method according to claim 13 wherein the determining comprises determining a timing of a next short monitoring period during at least a first period and disabling at least one non-deterministic number generator involved in the determining during at least a second period.

20. The method according to claim 19 wherein the first period is a powering up period.

* * * * *